(12) United States Patent
Poznansky et al.

(10) Patent No.: US 9,092,054 B2
(45) Date of Patent: Jul. 28, 2015

(54) ELECTRONIC REMOTE CONTROL THIMBLE

(71) Applicants: Amir Poznansky, Tel Aviv (IL); Asher Yahalom, Givaat Shmuel (IL); Haim Cohen, Beit-Hashmonay (IL)

(72) Inventors: Amir Poznansky, Tel Aviv (IL); Asher Yahalom, Givaat Shmuel (IL); Haim Cohen, Beit-Hashmonay (IL)

( * ) Notice: Subject to any disclaimer, the term of this patent is extended or adjusted under 35 U.S.C. 154(b) by 276 days.

(21) Appl. No.: 13/864,139

(22) Filed: Apr. 16, 2013

(65) Prior Publication Data

US 2013/0271363 A1    Oct. 17, 2013

Related U.S. Application Data

(60) Provisional application No. 61/624,541, filed on Apr. 16, 2012.

(51) Int. Cl.
G06F 3/03      (2006.01)
G06F 3/0338    (2013.01)
G06F 3/01      (2006.01)
G06F 3/0346    (2013.01)
G06F 3/0354    (2013.01)

(52) U.S. Cl.
CPC .............. *G06F 3/014* (2013.01); *G06F 3/0346* (2013.01); *G06F 3/03547* (2013.01); *G06F 2203/0331* (2013.01); *G08C 2201/32* (2013.01); *G08C 2201/91* (2013.01)

(58) Field of Classification Search
USPC ................................................. 345/156–184
See application file for complete search history.

(56) References Cited

U.S. PATENT DOCUMENTS

2002/0125324 A1*  9/2002  Yavid et al. .............. 235/462.45
2007/0063130 A1*  3/2007  Ahn et al. .................... 250/221

* cited by examiner

*Primary Examiner* — Charles V Hicks
*Assistant Examiner* — Jeffrey S Steinberg
(74) *Attorney, Agent, or Firm* — ARC IP Law, PC; Joseph J. Mayo

(57) ABSTRACT

The Thimble is a wireless electronic device that can be worn on a finger, in order to control electronic devices, computers screens, laptops screen, televisions game console etc. The Thimble can replace either a computer mouse or a remote control. The Thimble uses location technologies in order to calculate its position, movement and orientation. Touch pads allow for accepting user selection, similar to mouse left-clicks or right-clicks, or remote control OK function.

11 Claims, 9 Drawing Sheets

ELECTRONIC REMOTE CONTROL THIMBLE

CROSS REFERENCE TO OTHER APPLICATIONS

This application claims the benefit of U.S. Provisional Application No. 61/624,541 filed on Apr. 16, 2012, which is hereby incorporated herein by reference.

BACKGROUND OF THE INVENTION

1. Field of the Invention

The present invention relates in general to computerized pointing systems and in particular to systems that can control electronic devices by recognizing a user's hand gestures.

2. Description of the Related Art

The computer industry experiences currently a large demand for using touch screens in particular in tablet computers and smart phones. The touch screen is supposed to relieve the user dependence on the optic or mechanic mouse.

Although the computer mouse has proven very popular with desktop computers, it can be cumbersome to use with more mobile devices such as computer laptops, tablet computers and smartphones. Most laptops come equipped with a built-in pointing device such as a touch pad over which the user moves his finger, or a joystick-like small lever that the user moves in different directions. These pointing devices can be uncomfortable to use and may slow the user when working with the mobile computing devices or other electronic devices.

Hand gestures on the other hand are very natural to use. The new generation of smartphones, for examples, Apple's™ smartphones, have a very intuitive and fast interface using hand gestures captured on a touch screen.

While touch screens have become the trend and norm for both smartphones and tablet computers, touch screens remain both expensive and rarer for laptops, desktop computers and large screens such as television sets.

There is thus a need in the industry to provide touch screen capability for using a hand gesture interface for screens that are not touch screens.

BRIEF SUMMARY OF INVENTION

The Thimble of the invention can transform any screen into a screen having touch screen capabilities, and even better. The Thimble can also be used as a control device for televisions, smartphones, tablet computers and their accessories (such as DVD players cable and satellite converters, game consoles, media players etc.).

The Thimble of the invention can replace current remote devices, such as the common infrared TV remote control and the computer mouse.

It is an object of the present invention to provide a remote control device denoted "Thimble" that can control a proximate electronic device such as a computer or a TV.

The Thimble of the invention is basically a sheet of flexible material (rubber, flexible plastic etc.) wrapped around a person's finger. The Thimble is typically made in a cylindrical form, like a ring, so that can easily be worn on a person's finger.

The Thimble is a wireless electronic device, that can be worn on a finger, in order to control electronic devices, computers screens, laptops screen, televisions game console etc.

Through the Thimble of the invention the computer is able to locate the position of a user's finger (the finger wearing the Thimble) with respect to the computer screen. The Thimble localization may be done by a multitude of methods, including but not limited to optical, acoustic, Radio Frequency (RF) or any other physical signal or combination thereof.

The Thimble is equipped with one or more touch pads to enable the Thimble to send signals to the computer, signals that can be interpreted according to the location of the user finger with respect to the screen. As is generally accepted, the movement of the finger wearing the Thimble (equivalent to the movements of a present day mouse) will be accompanied by a movement of a pointer on the screen.

Using the Thimble has an inherit advantage over using a mouse in that one does not have to divert his attention (eyes) from the screen in order to move the pointer and use the Thimble functionality. Using a mouse forces the user the look at the screen and at the mouse alternatively, while with the Thimble the user needs to look only at the screen. In addition, the Thimble system is more user-friendly and intuitive, since the user just points at the object on the screen that he wishes to manipulate. Such an object can be a menu appearing on the window of a particular program, or any other computer object.

The present invention thus relates to a Thimble adapted to be worn on a finger for manipulating an electronic device with a screen, comprising:

a. a Micro Electro Mechanical System (MEMS) Micro Gyroscope unit for determining orientation changes of said Thimble;

b. a light-emitting diode (LED) optical sensor located on the front of the Thimble so that the Thimble position can be detected when said LED optical sensor is directed at the screen;

c. one or more touch pads for capturing when a user presses a touch pad, said one or more touch pads also used as a supplementary charging source;

d. a power supply source for powering the Thimble;

e. a communication unit; and f. a processing unit for receiving from said Micro Gyroscope and optical sensor data regarding the orientation change and position of the Thimble, and receiving from said one or more touch pads information when a user presses any touch pad, and calculating the distance of the movement in space by the finger wearing the Thimble, and communicating via the communication unit information regarding movement, orientation of the Thimble and pressing of a touch pad to said electronic device, wherein said Thimble having a substantially cylindrical form so it can be worn around a finger.

In some embodiments, the electronic device is a computer, a laptop computer, a telephone, a smartphone, a television set or a game console.

In some embodiments, the power supply source is a paper battery.

In some embodiments, the communication unit is a Near Field Communication (NFC) unit.

In some embodiments, the one or more touch pads are Nano Sensor piezoelectric touch pads.

In some embodiments, the Thimble further comprises a Micro Camera located on the front of the Thimble.

In some embodiments, the Thimble further comprises a Radio Frequency Identification (RFID) unit.

In some embodiments, the Thimble further comprises a Radio Frequency (RF) Radar sensor to measure the distance between the Thimble to adjacent fingers.

In some embodiments, the Thimble emulates the functions of a computer mouse.

In some embodiments, the Thimble emulates the functions of a remote control.

In another aspect, the present invention relates to a Thimble adapted to be worn on a finger for manipulating an electronic device with a screen, comprising:

a. a movement identification unit for determining orientation changes and movement of said Thimble;

b. a light-emitting diode (LED) optical sensor located on the front of the Thimble so that the Thimble position can be detected when said LED optical sensor is directed at the screen;

c. one or more touch pads for capturing when a user presses a touch pad, said one or more touch pads also used as a supplementary charging source;

d. a power supply source for powering the Thimble;

e. a wireless communication unit; and f. a processing unit for receiving from said movement identification and optical sensor data regarding the orientation change and position of the Thimble, and receiving from said one or more touch pads information when a user presses any touch pad, and calculating the distance of the movement in space by the finger wearing the Thimble, and communicating via the communication unit information regarding movement, orientation of the Thimble and pressing of a touch pad to said electronic device, wherein said Thimble having a substantially cylindrical form so it can be worn around a finger.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

The present invention relates to a Thimble that works as a wireless electronic control device for replacing pointing devices such as an electronic mouse for a computer, electronic remote control device for television and sound system. In another aspect, the Thimble can be used to control the computer screen directly similarly to a touch screen usage.

Figure 1:
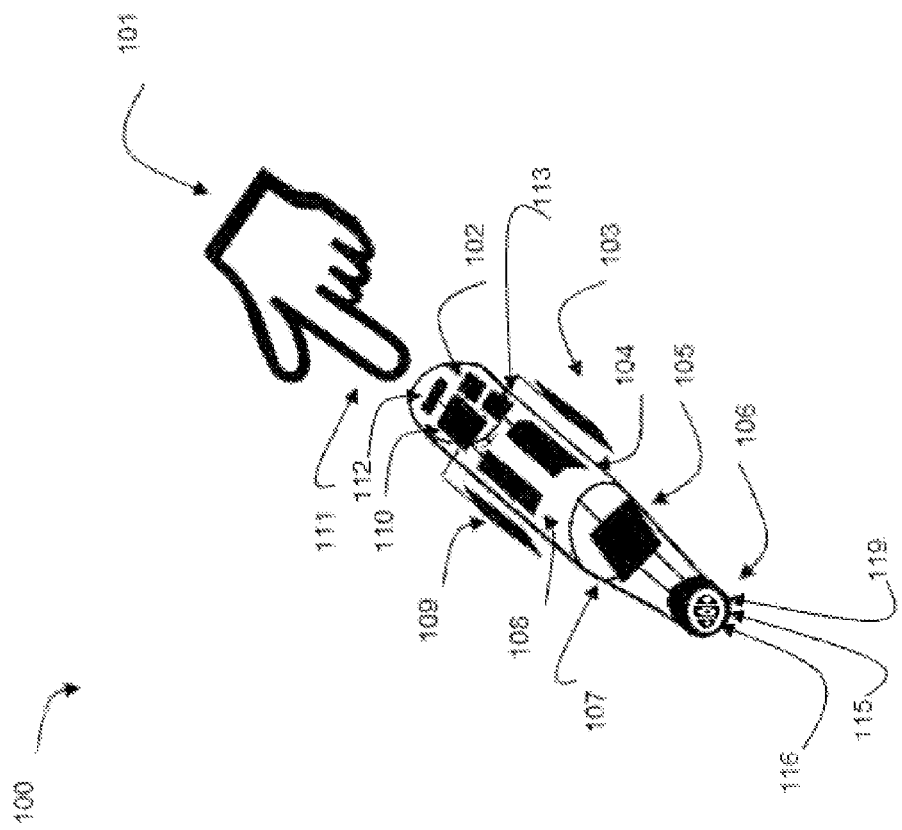
FIG. 1 is a conceptual representation of an embodiment of an electro-optic location Thimble which comprises a micro camera or LED optical sensor, a gyroscope for determining orientation change, RF rechargeable paper battery needed to supply the power needs of the Thimble, touch pads which are input devices similar to the mouse buttons, an RF radar sensor that enables zoom application by measuring the distance between the Thimble which is worn on a finger to both adjacent fingers from both sides of the Thimble, a processor driving and controlling the different Thimble components, a Radio Frequency Identification (RFID) unit integrated with Near Field Communications (NFC) unit providing communications between the Thimble and the controlled device and also used for RF charging of the paper battery. The Thimble is to be inserted on one's finger as depicted in the figure.

Reference is now made to FIG. 1 illustrating an embodiment of the electronic Thimble 100 of the present invention. The Thimble can be formed from an elastic laminar plastic 102, or similar materials (plastic, composite materials, metals etc.). The Thimble 100 can be made in different sizes to fit different finger widths. For example, small, medium, large, extra-large etc. depending on the user 101 age and finger size. The Thimble 100 comprises an independent power source based on Radio Frequency (RF) rechargeable paper battery 104 covering the entire area of the laminar plastic 102, using the Radio Frequency unit 112 such as Bluetooth and etc. in order to transmit and receive data (615 in FIG. 6) from the controlled devices (computer, television etc.) (508, 603 in FIG. 6) and for RF charging (512 in FIG. 5) with the docking station (502 in FIG. 5) the RF unit 112 can be implemented with a standard Bluetooth, integrated with The Near Field (NFC) Communication unit 113 and Radio Frequency Identify unit 114 (RFID) for communicating (transmitting and receiving data) 615 from other electronic devices such as game console (613 in FIG. 6) or Smart TV (508 in FIG. 6) by the NFC unit 113. The Thimble has Central Processing Unit (CPU) 110 Nanochip which calculates the distance X (706 in FIG. 7) of the movement in the space by the finger 111 (on which the Thimble 100 is worn) using the data received (615 in FIG. 6) from components in the Thimble 100 that can provide location, movement, position or orientation data. These components can include the NFC unit 113 and the Micro Electro Mechanical System's (MEMS) Micro Gyroscope unit 105 for determining orientation change, and the optical LED 115, and optical sensor 116, Infra-Red 106 (IR) transmitter, and the Micro Camera 119 which is located on the front of the Thimble at the top of the finger 111. The IR LED 106 transmits directly to a TV (in 508 FIG. 5) remote flashes at 38 Khz The measurement process of the distance movement x (706 in FIG. 7) is widely described at the methods of Thimble 100 localization at the paragraph below.

The Thimble 100 has two Nano Sensor piezoelectric touch pads 109, 103, which are used as input data buttons for games application (613 in FIG. 6), TV control (508 in FIG. 5), or touch pads used as an input devices similar to the mouse buttons of a common computer (713 in FIG. 7) mouse. The number of touch pads can be any number, one, two, three, four or more. The piezoelectric Nano Sensor touch pads 109, 103, are also used as a supplementary charging source, since the piezoelectric are generating direct current (DC) while pressing it.

The RF Radar sensor 108 enables zooming application (800 in FIG. 8) by measurement the distance between the Thimble 100 which dressed on the finger 111 to both adjacent fingers from both sides of the Thimble 100.

Figure 2:
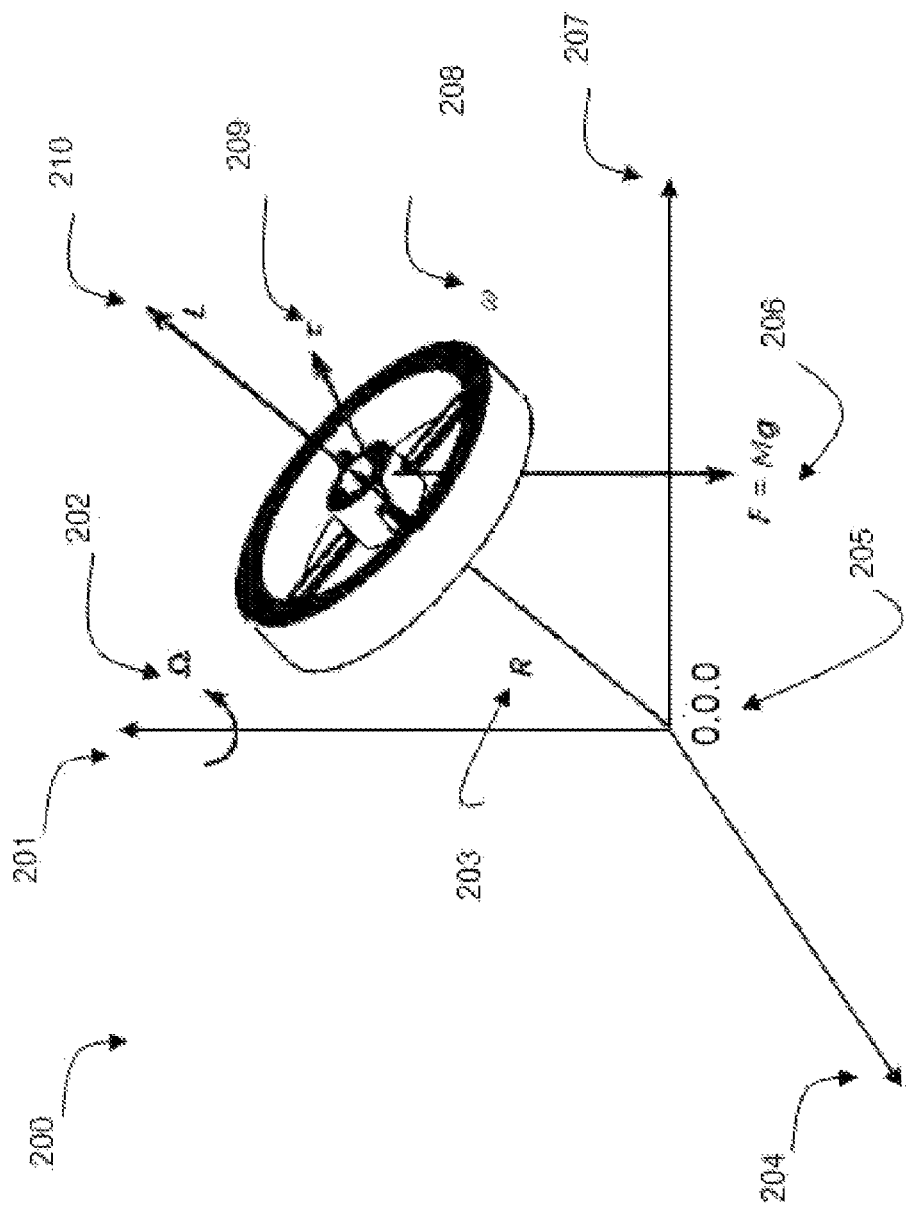
FIG. 2 is a conceptual description of a mechanical gyroscope which explains its operation by referring to various mechanical concepts such as angular velocity, angular momentum, torque and force. The gyroscope unit which is installed in the Thimble together with the optical LED sensor and the mini camera (optional) is used to calculate the distance of the movement in the space or the distance of the cursor while the Thimble is used as "computer mouse" or while it is used in "touch screen" applications.

Reference is now made to FIG. 2 which is a conceptual description of a mechanical gyroscope 200 which explains its operation by referring to various mechanical concepts such as angular velocity 202,208, angular momentum 210, torque 209 and force 206. The gyroscope unit 200 which is installed in the Thimble 100 together with the optical LED sensor 116 and the mini camera 119 (optional) are used to calculate the distance of the movement in the space or the distance of the cursor (605 in FIG. 6) while the Thimble 100 is used as computer 713 in FIG. 7 "mouse" or while it is used as a "touch screen" application 705 in FIG. 7. In some embodiments, a miniaturized mechanical gyroscope 300 is used and thus the more traditional gyroscope 200 is provided for illustration only. FIG. 2 contains a three axis coordinate system 201,204, 207, a rotating wheel is located a distance R 203 from the origin of axis 205 and the force of gravity 206 acts on the wheel. The rotation 202 corresponding to change of direction of finger 111 is performed around the axis 201 and the rotation 208 is performed around the wheel symmetry axis 210, the angular momentum due to that motion is described by the letter L. Attempting to change the orientation of the wheel will result in a resistance torque τ which can be measured and from it one can deduce the angular speed of such a motion, this information can be used to deduce the orientation change of the finger 111 which in turn can be used to move a pointer on a computer screen.

Figure 3:
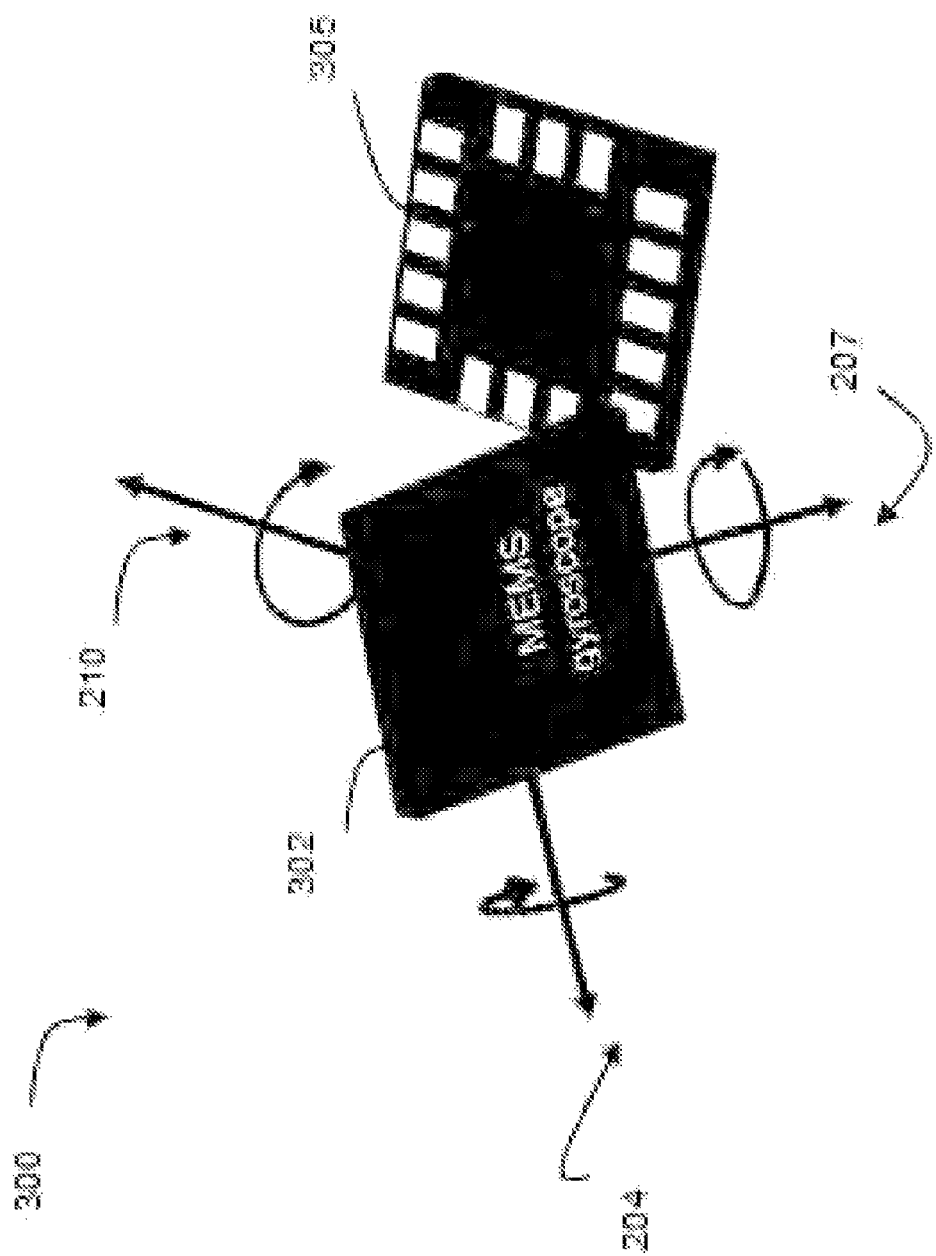
FIG. 3 is a photograph of a miniaturized Microelectromechanical system (MEMS) gyroscope unit.

Reference is now made to FIG. 3 which is a photograph of a miniaturized MEMS gyroscope unit 300. This gyroscope 300 contains physical elements equivalent to three rotating wheels, the axis of rotation of those "wheels" are 210, 204, 207, the internal structure of the MEMS gyroscope unit 300 is not shown, but only the front cover 302 and back cover 305 are shown.

Figure 4:
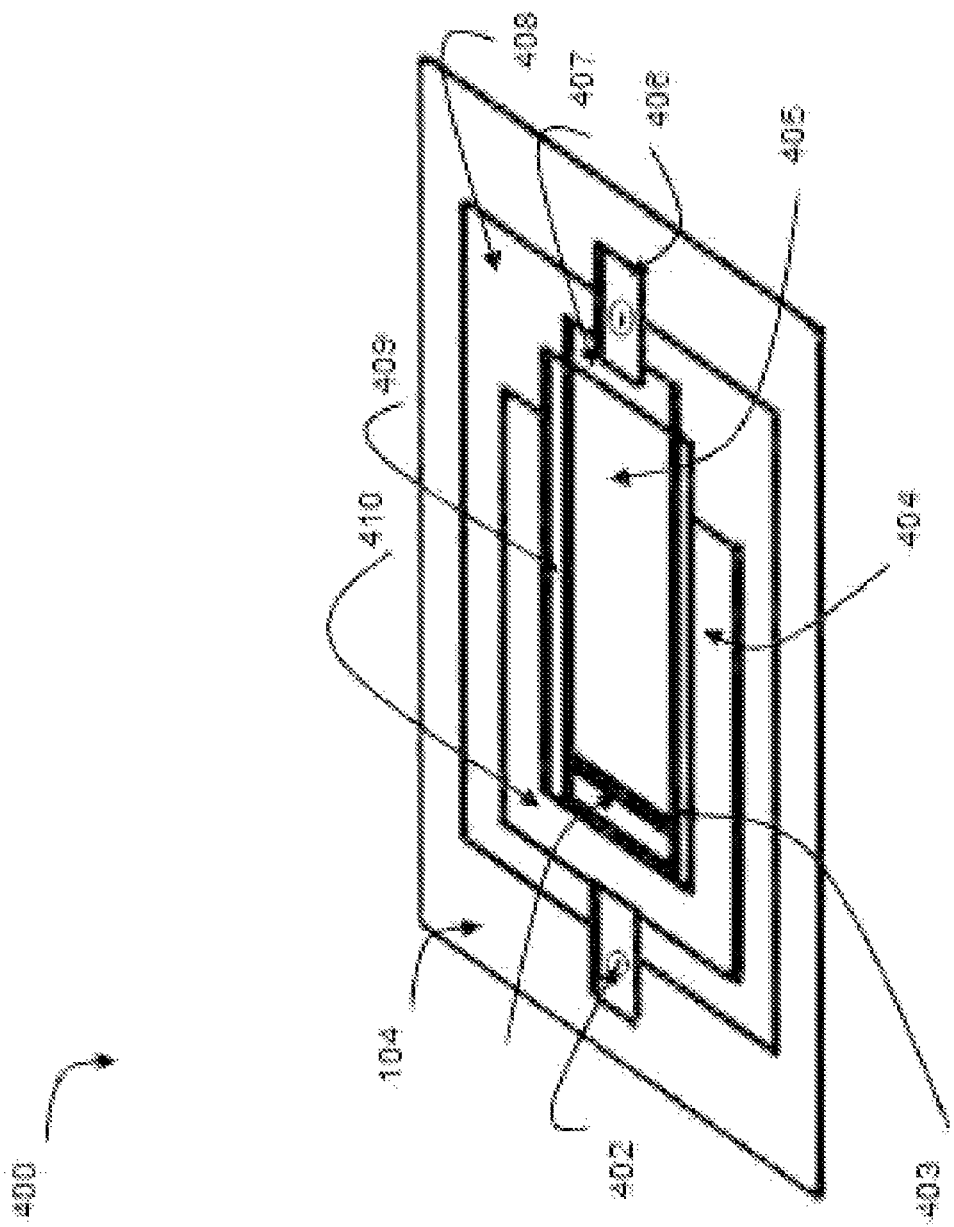
FIG. 4 is conceptual description of a RF rechargeable paper battery which is an essential part of the Thimble of the invention.

Reference is now made to FIG. 4 which is a conceptual description 400 of an RF rechargeable paper battery 104 which is an essential part of the invention. The battery 104 supplies the electrical power needs of the Thimble 100 and the source of could be of several modes (the copper Magnesium battery given below is only one possibility for such batteries). The power capacity of the battery (in mAmps× Hour) is dependent on the type of Thimble 100 to be used. Mounted in the surrounded or at the cross sectional area of the laminar plastic 102 comprising an upper transparent laminating film 408, lower transparent laminating film 401, slit for Oxidation catalyst 411, paper with Copper Chloride (CuCl) carbon 403, the PPE (Positive Potential Electrode) 402, Copper layer 404, Magnesium layer 405, Slit for Air Transport 407 and the NNE (Negative Potential Electrode) 406.

Figure 5:
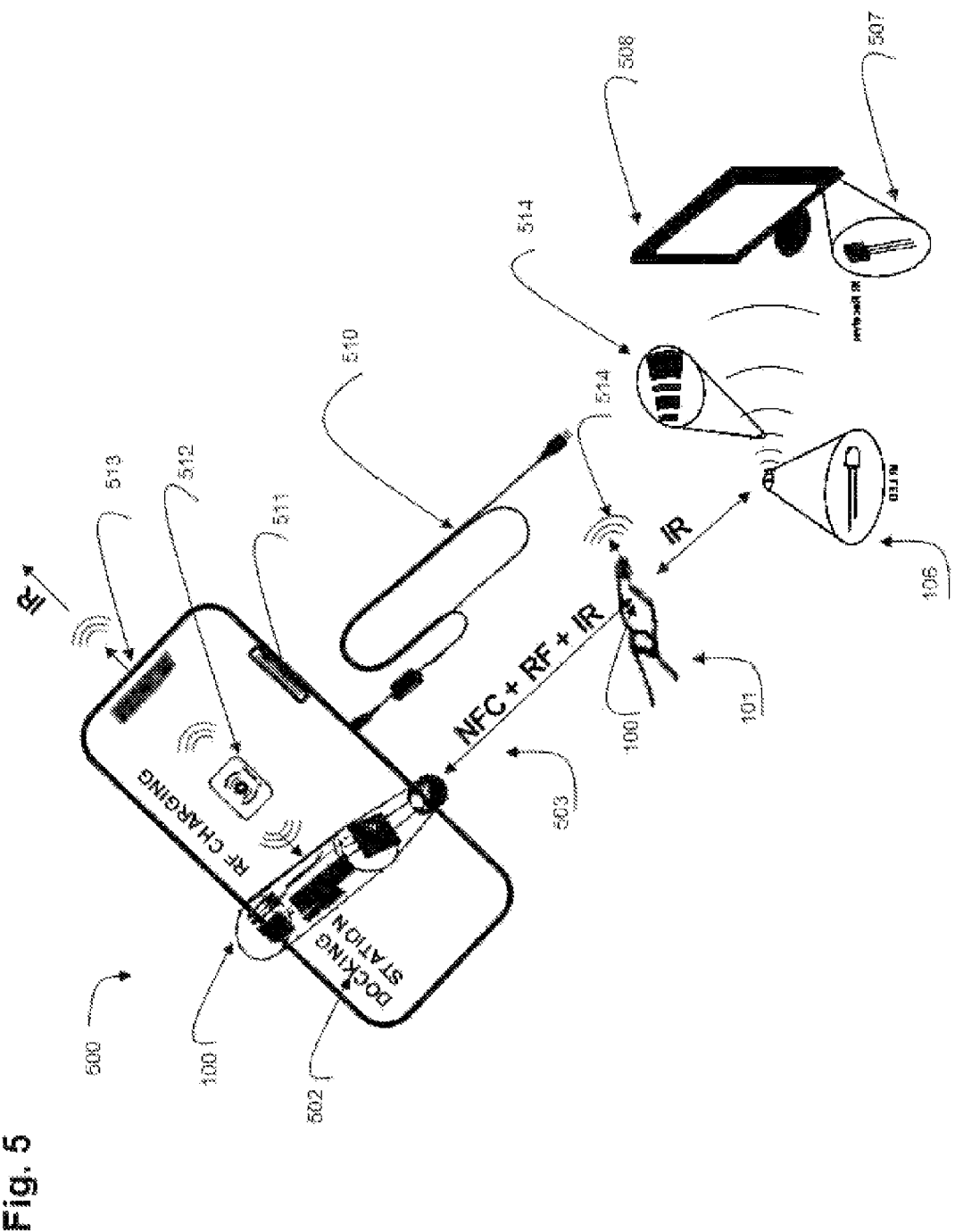
FIG. 5 illustrates a docking Radio Frequency (RF) charging station, and Infrared (IR) broadcast station.

Reference is now made to FIG. 5 illustrating 500 an embodiment of the electronic docking station 502 using a RF inductive charging unit 512, while the Thimble 100 is lying 501 on the docking station 502 it receives the magnetic field from the docking station 502 directly to RF unit 112 in the Thimble 100 and change it to direct current (DC) by diodes bridge to charge the chargeable paper battery 104 in the laminar 102, at the docking station 502 there is a broadcast system 513 use to amplify the signal from the IR unit 514 amplifying the signal which is coming from the IR LED 106 in the Thimble 100 dressed on the user hand 101 transmit 514 the data to the IR 507 unit at PASSIVE devices (916 in FIG. 9) such as: TV 508 or at the Audio System, and etc., or to the ACTIVE devices (929 in FIG. 9) such as: smart phones (611 in FIG. 6), tablets computers, game consoles (613 in FIG. 6), computers (713 in FIG. 7) and etc. There is also an option to connect the docking station 502 to Smart TV 508 or to personal computer (PC) (713 in FIG. 7) or tablet and etc., directly by using a Universal Serial Bus (USB) cable 510. The user can also control the power of the docking station by the local buttons 511.

Figure 6:
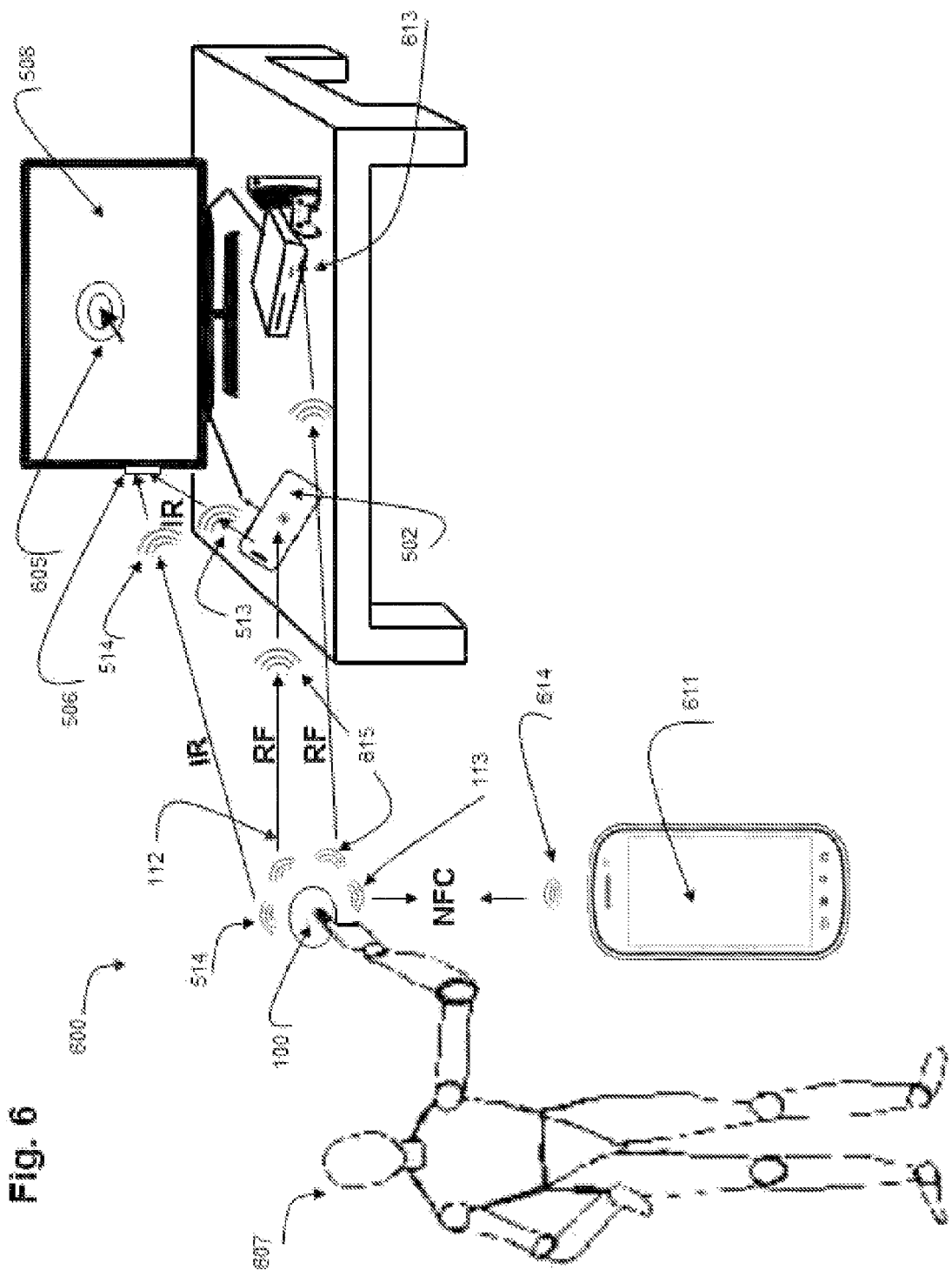
FIG. 6 illustrates the transmission topology of the Thimble and the different communications protocols used to control different devices from the Thimble worn on the user's finger: Using NFC communication in order to control active devices such as smart phones devices, tablet computers etc.; Using Bluetooth, or Radio Frequency (RF) communication in order to control game consoles, or when using the Thimble as a computer mouse; and using IR communication in order to control passive devices such as television sets, Audio Systems, or to increase the IR signal through the broadcast point at the docking station.

Reference is now made to FIG. 6 illustrating the transmission communication topology 600 of the Thimble 100, and its different communications protocols used to control different devices from the Thimble 100 worn on the user's 607 finger 111: Using NFC 113 communication in order to control active devices (926 in FIG. 9) such as smart phones 611, tablet computers etc.; Using RF communication 615 such as two way Radio Frequency (RF) data communication such as Bluetooth 112 in order to control game consoles 613, or when using the Thimble 100 as a computer (713 in FIG. 7) mouse; and using IR (16) communication 514 in order to control passive devices (916 in FIG. 9) such as television 508 sets, Audio Systems, or to increase the IR signal 514 through the broadcast point 513 at the docking station 502.

Figure 7:
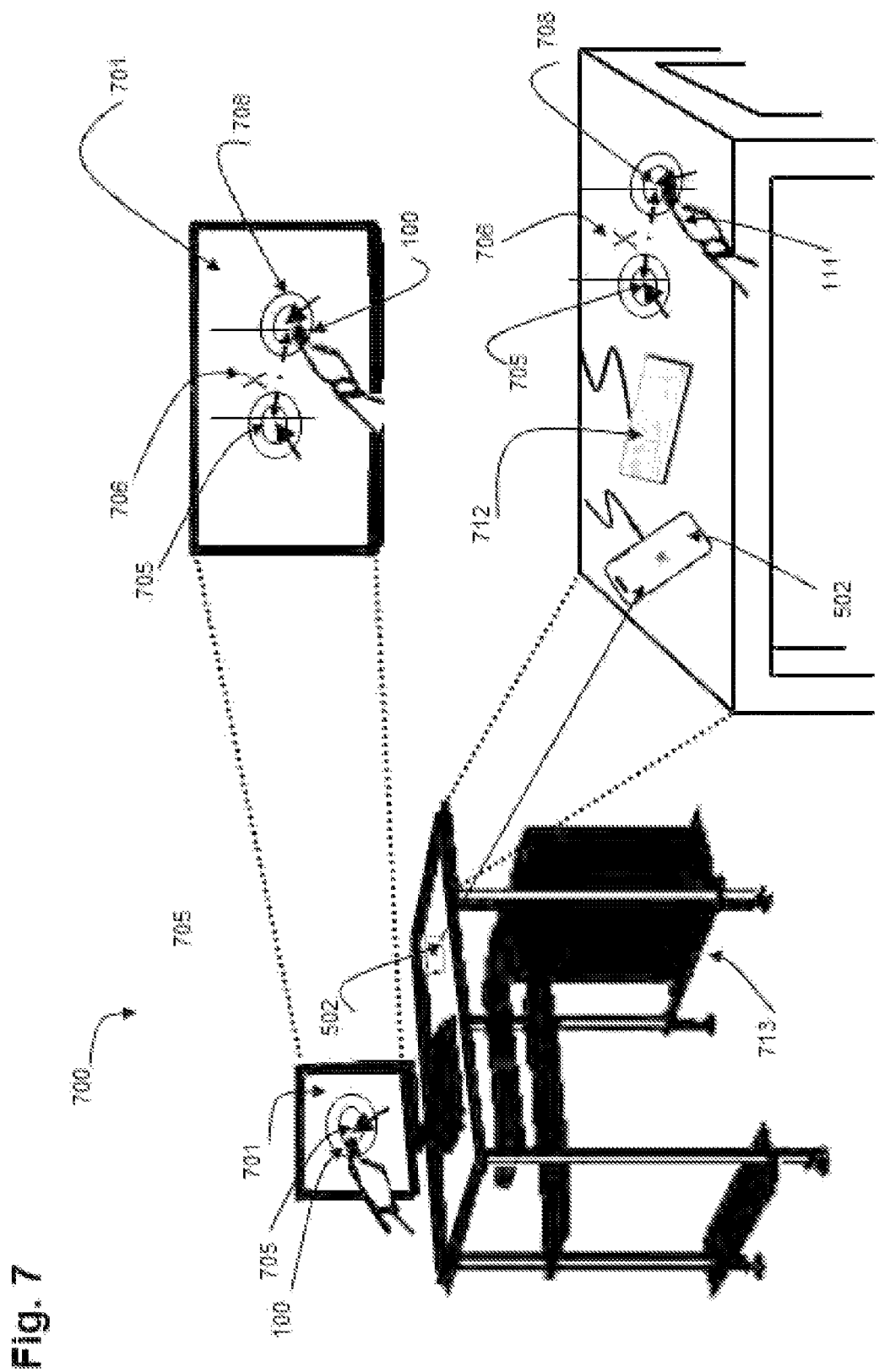
FIG. 7 is a conceptual description of measurement the movement of the Thimble either while using the Thimble as computer mouse or while having the Thimble touch the computer screen to emulate a touch screen.

Reference is now made to FIG. 7 illustrating a conceptual description of measurement the movement X 706 of the Thimble 100 either while using the Thimble 100 as computer 713 mouse or while having the Thimble 100 touch 705 the computer screen 701 to emulate a touch screen. The docking station 502 connected to the computer 713 by USB 510 cable, uses of RF charging 512 of the Thimble 100 battery 104, and to transit the data from the Thimble 100 to the computer 713 through the USB 510 port. The user 607 has to locate his finger 111 on the cursor 708 and to move it to the target point 705, the LED 115 sign the moving X 706 while the sensor 116 meters the way, the ALU unit (915 in FIG. 9) in the CPU (510) calculate the distance and the orientation using the gyro 105 data. The user 607 can work on the keyboard 712 dressing the Thimble, while he has to operate a "mouse" application the user 607 can use the Thimble 100, for example to sign under line, the user 607 has to move the cursor 700 to the target line, without losing the view of the screen 701, and to move on the line X 706, on the screen 701 or on the table, then to click with the finger at right side on the Thimble 100, in order to open an operation menu, then to click with the finger at the left side of the Thimble 100 in order to conform the operation (ENTER) (8E in FIG. 8), both side of the Thimble 100 said, mounted with piezoelectric chip 103, 109 use as a buttons, and for additional backup charging, since the piezoelectric are generating direct current (DC) while pressing it.

Figure 8:
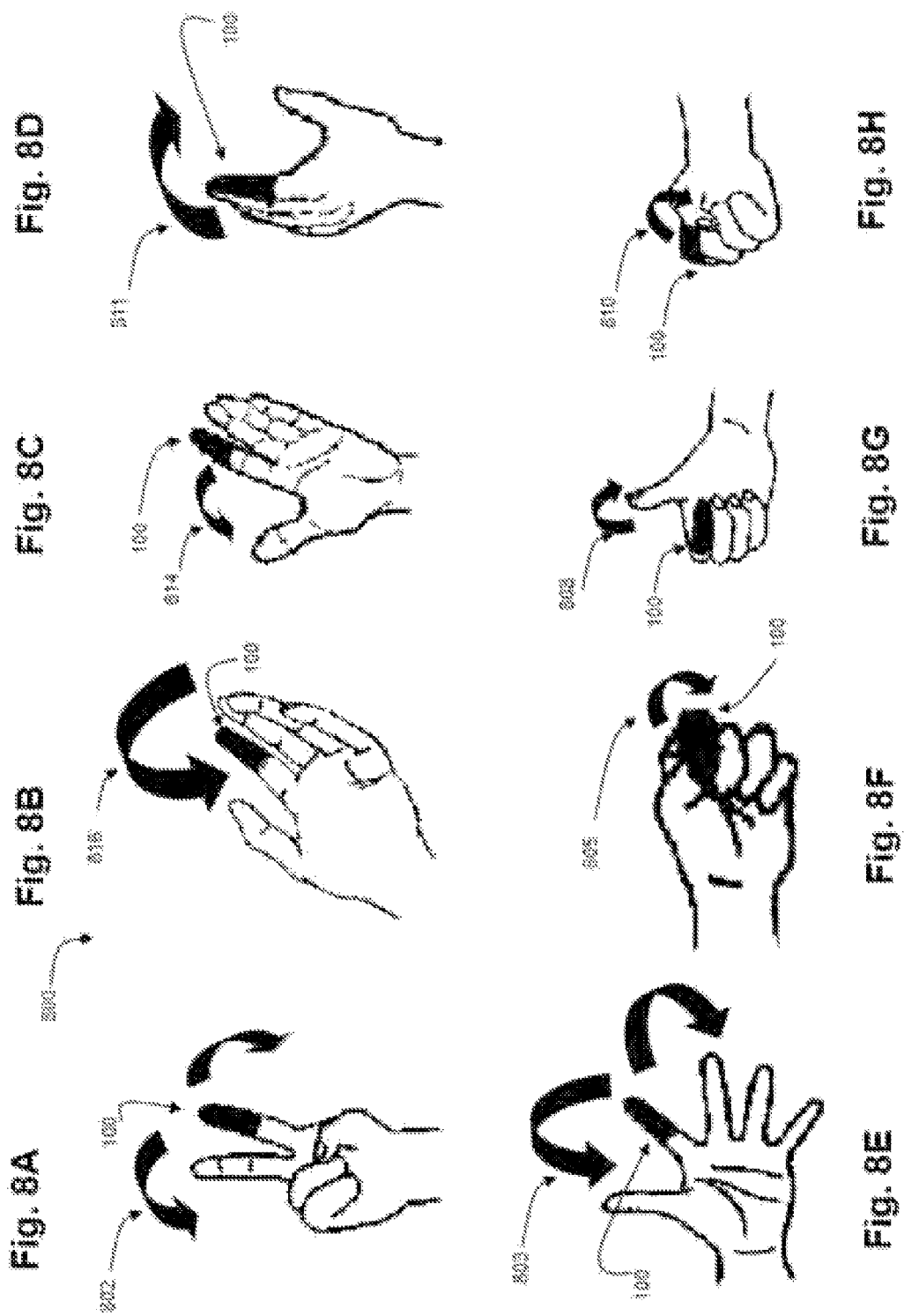
FIG. 8A-H illustrate different hand gestures with the Thimble in order to instruct functions such as rolling page, zooming, confirmation option, channels, change, volume Amplification and attenuation, while using the fingers of the hand and the Thimble radar sensor to measure the distance between the Thimble and the adjacent fingers.

Reference is now made to FIG. 8 illustrating different hand gestures with the Thimble 100 in order to instruct different functions. The gyro unit 105 measures the movement and the orientation in the space, while the radar sensor 108 measures the distance between the fingers to the finger 111 which is dressed with the Thimble 100, the piezoelectric indicates to the ALU (915 in FIG. 9) the aim of the operation as described below:

FIG. 8A—illustrates an embodiment of a "Cutting Line" operation.

FIG. 8B—illustrates an embodiment of a "Copy Line" operation.

FIG. 8C—illustrates an embodiment of a "Paste Line" operation.

FIG. 8D—illustrates an embodiment of a "Moving the current page Right and Left" operation, or changing channel while using the Thimble 100 to control TV 506.

FIG. 8E—illustrates an embodiment of a "Mouse Operation"—click with the finger from the Right side toward the Thimble 100, means open a menu bar, click with the finger from the left side toward the Thimble 100, means execution (Enter).

FIG. 8F—illustrates an embodiment of a "Shooting a gun" while using game console 613, or PC game.

FIG. 8G—illustrates an embodiment of a "LIKE" operation.

FIG. 8H—illustrates an embodiment of a "Rolling the current Page" operation (up and down), or changing the volume while using the Thimble 100 to control TV 506.

Figure 9:
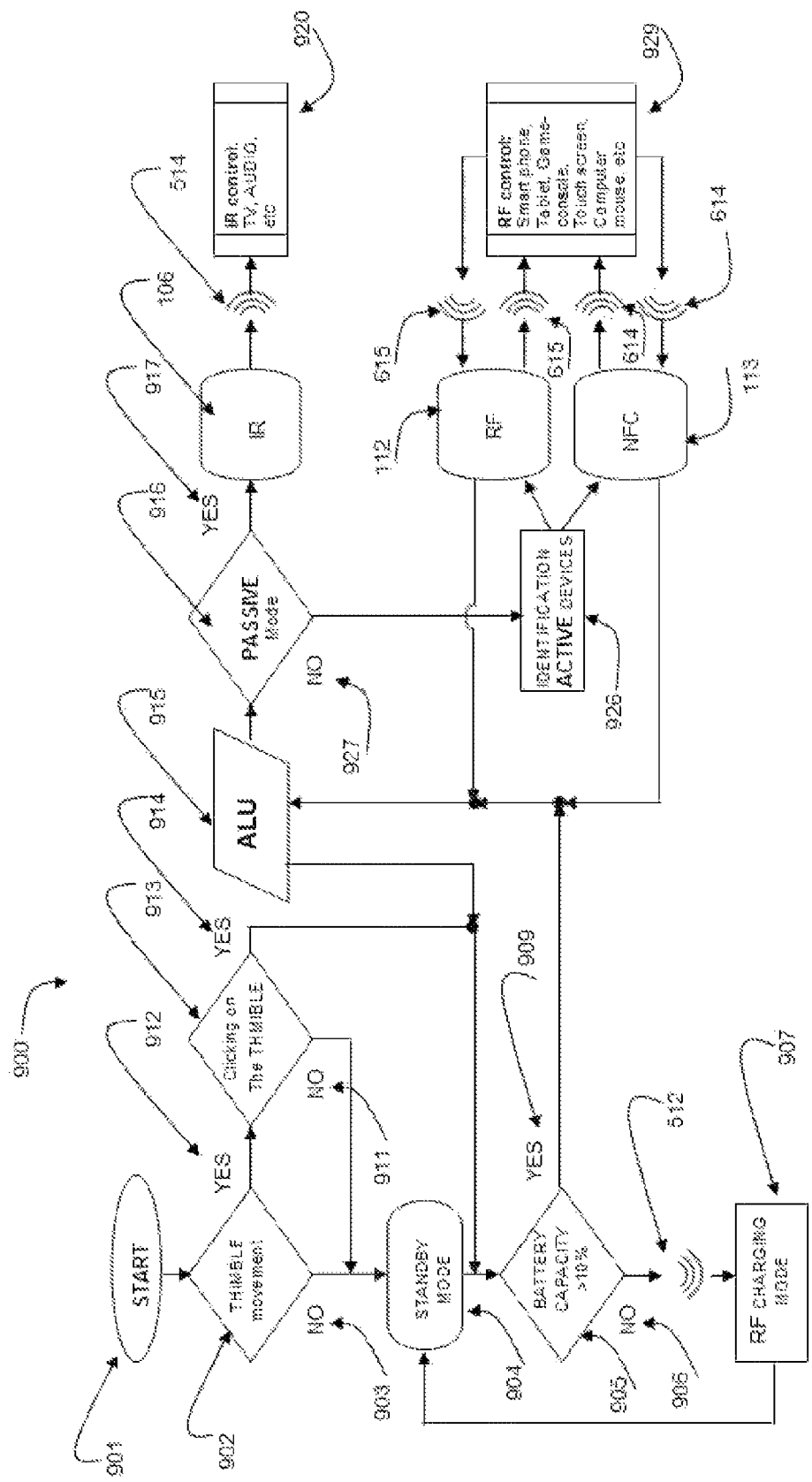
FIG. 9 is a logical flowchart diagram which illustrates the logical operation of the Thimble.

Reference is now made to FIG. 9 illustrating a logical flowchart diagram 900 of the Thimble 100 operation, starting point 901, as long as the Thimble 100 is lying on the docking station 502 without any movement 903 connected to ACTIVE devices 929 such as PC 713 or to PASSIVE devices such as TV 920 by USB cable 510, the Thimble is in standby mode 910 charging 907 the battery 104 by the RF charging unit 512 on the docking station 502. The Arithmetic Logic Unit 915 in the CPU 110 which is setting the operation system of the Thimble 100 is keeping the Thimble 100 out of order in a standby mode 910 as long as 906 the battery 104 capacity is less than 10% 905. If the user 607 is moving 912 the Thimble 100, the Thimble 100 is changing is mode to "movement mode" 902, the ALU 915 is checking if there is any clicking 913 on the piezoelectric buttons 103, 109, if there is any clicking 911, the Thimble is going back to "Stand By" mode 904, if the ALU gets a pressing indications 914 from the piezoelectric buttons 103, 109, the Thimble 100 checks its battery capacity 905, if it less than 10% 906 staying in "Stand By" mode, otherwise 909 the ALU 915 switching on the Thimble 100 scanning for ACTIVE 926 or PASSIVE 916 devices, using its NFC unit 113, RF communication unit 112 (such as Bluetooth), and the IR unit 106, while detecting a PASSIVE device 917 the Thimble 100 is using the IR led 106 in order to transmit 514 IR data to the device 920, if there is no 927 PASSIVE device, the ALU goes to ACTIVE mode 926, using the RF unit 112 and the its NFC unit 113 in order to transmit and receive two way data 615, for example by using standard Bluetooth communication protocol 615, or NFC 614 standard communication protocol to the ACTIVE device 929 for example smart phone 611.

Methods of Thimble Localization

There are several ways a Thimble 100 of the invention can localized, some embodiments are described below:

1. Using a MEMS gyroscope 300 one can detect a change in the orientation of the Thimble 100 but not in the location of its center of mass. (See FIG. 2 for a depiction of a classical mechanical gyroscope 200 and FIG. 3 for a depiction of a modern MEMS gyroscope 300)

2. Using an optic LED 115 pointing devices detecting by the optical sensor 116 or the micro camera 119 directed at the screen one can locate the Thimble 100 in the same way that an optical mouse motion is located on the table the optical sensor will measures the distance X (706 on FIG. 7) by the Arithmetic Logic Unit in the CPU 110 betweens to point on the screen (705, 708 in FIG. 7) from the beginning of the movement till the end while the GYRO 106 indicating the movement duration.

Modern surface-independent optical mouse operates by using an optoelectronic sensor (essentially, a tiny low-resolution video camera) to obtain successive images of the surface on which the mouse operates. As computing power grew cheaper, it became possible to embed more powerful special-purpose image-processing chips in the mouse itself. This improved power enabled the mouse to detect relative motion on a wide variety of surfaces, translating the movement X (706, in FIG. 7) of the mouse into the movement of the cursor and eliminating the need for a special mouse-pad. It also paved the way to widespread adoption of optical mouse. An optical mouse illuminates the surface that they track over, using a LED 115 or a laser diode. Changes between one frame and the next are processed by the image processing part of the chip and translated into movement on the two axes using an optical flow estimation algorithm. For example, the Avago Technologies ADNS-2610 optical mouse sensor processes 1512 frames per second: each frame consisting of a rectangular array of 18×18 pixels and each pixel can sense 64 different levels of gray. Razer DeathAdder processes 6,400 frames per second. It should be noticed, however, that the screen being a smoother surface and therefore a reflective surface will probably require a shorter wavelength LED or a more sensitive optical sensor since the amount of diffusive reflection will be reduced. Like a remote mouse the Thimble 100 transmits information about its movement using wireless USB standards, Bluetooth 112 or Infrared 106.

3. Alternatively, using one or more cameras 106 located in vicinity to the computer or the television set one can track the finger 111 using appropriate imaging processing software and utilize this information to displace a pointer on the screen (707 in FIG. 7). In this case, no further devices are needed on the finger 111 except touchpads 109, 103 to allow for left (piezoelectric chip) 119 click in order to confirm the operation or right clicks (piezoelectric chip) 103 to open a menu bar on the screen, using a width band to transmit this information to the docking station and from there by the Universal Serial Bus (USB) (510 in FIG. 5) to the computer (700 in FIG. 7).

4. An acoustic system based on more than three acoustic sensors (microphones) located on the screen (707 in FIG. 7) and an additional acoustic transmitter located in the Thimble 100 (transmitting signal in frequencies far above the hearing frequency limits) allows the computer to compute the spatial location of the Thimble 100 through acoustic source localization. The signals received by the sensors can be transmitted to the Computer (telephone, television) CPU 110 through established wireless standards RFID 114, BLUETOOTH 112, wireless USB or infrared 106. Acoustic source localization is the task of locating a sound source given measurements of the sound field at several disparate locations. Microphone arrays are typically employed for the sampling of the spatial sound field. Some have termed acoustic source localization an "inverse problem" in that the measured sound field is translated to the position of the sound source. Central to the acoustic source localization problem is the cross-correlation function between two microphones, defined as:

$$R_{x_1,x_2}(\tau) = \sum_{m=-\infty}^{\infty} x_1(n)x_2(n+\tau)$$

which defines the level of correlation between the outputs of two microphones $x_1$ and $x_2$. In general, a higher level of correlation means that the argument $\tau$ is relatively close to the actual time-difference-of-arrival (TDOA) between the two microphones for the source:

$$\tau_{true} = \frac{d_{s,1} - d_{s,2}}{c}$$

One should notice that screen (707 in FIG. 7) localization is a degenerate form of spatial localization and in fact using acoustic localization one can locate the position of the Thimble 100 far away from the screen. This feature will appear useful for devices that should be controlled from a relatively remote location such as televisions (614 in FIG. 6). And as such is superior to LED localization 115.

There are several ways a Thimble or its acoustic sensors can communicate with the computer or television those include RFID 114, BLUETOOTH 112, wireless USB or infrared.

5. Television 614 remote controls flash an Infrared (IR) LED 603 on/off at about a given frequency (typically about 38 kHz) for certain periods of time, with periods of off-time in between. Each key on the remote control is assigned a different pattern of flashing/off that is recognized by the television set. The Thimble 100 can generate IR 106 flashings in different patterns in the same way a television remote control does.

The Thimble 100 can be powered by a flexible paper battery (FIG. 4) which is rechargeable using a rectenna (512 in FIG. 5) and a charging pad (502 in FIG. 5). The Thimble 100 can also be charged using a piezoelectric component 109, 103 when pressed against the screen or any other available surface.

Both of the touchpad's 109, 103 in both sides can be used for selecting items from menus, highlighting objects and moving up or down the screen (similarly to a computer mouse left-button and right-button). Basically, they will serve as a mouse buttons (spring-loaded regions on the mouse.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A Thimble adapted to be worn on a finger for manipulating an electronic device with a screen, comprising:
    a Micro Electro Mechanical System (MEMS) Micro Gyroscope unit for determining orientation changes of said Thimble;
    a light-emitting diode (LED) optical sensor located on the front of the Thimble so that the Thimble position can be detected when said LED optical sensor is directed at the screen;
    one or more touch pads for capturing when a user presses a touch pad, said one or more touch pads also used as a supplementary charging source;
    a power supply source for powering the Thimble;
    a communication unit; and
    a processing unit for receiving from said Micro Gyroscope and optical sensor data regarding the orientation change and position of the Thimble, and receiving from said one or more touch pads information when a user presses any touch pad, and calculating the distance of the movement in space by the finger wearing the Thimble, and communicating via the communication unit information regarding movement, orientation of the Thimble and pressing of a touch pad to said electronic device, wherein said Thimble having a substantially cylindrical form so it can be worn around a finger.

2. The Thimble according to claim 1, wherein said electronic device is a computer, a laptop computer, a telephone, a smartphone, a television set or a game console.

3. The Thimble according to claim 1, wherein said power supply source is a paper battery.

4. The Thimble according to claim 1, wherein said communication unit is a Near Field Communication (NFC) unit.

5. The Thimble according to claim 1, wherein said one or more touch pads are Nano Sensor piezoelectric touch pads.

6. The Thimble according to claim 1, further comprising a Micro Camera located on the front of the Thimble.

7. The Thimble according to claim 1, further comprising a Radio Frequency Identification (RFID) unit.

8. The Thimble according to claim 1, further comprising a Radio Frequency (RF) Radar sensor to measure the distance between the Thimble to adjacent fingers.

9. The Thimble according to claim 1, emulating the functions of a computer mouse.

10. The Thimble according to claim 1, emulating the functions of a remote control.

11. A Thimble adapted to be worn on a finger for manipulating an electronic device with a screen, comprising:

a movement identification unit for determining orientation changes and movement of said Thimble;

a light-emitting diode (LED) optical sensor located on the front of the Thimble so that the Thimble position can be detected when said LED optical sensor is directed at the screen;

one or more touch pads for capturing when a user presses a touch pad, said one or more touch pads also used as a supplementary charging source;

a power supply source for powering the Thimble;

a wireless communication unit; and a processing unit for receiving from said movement identification and optical sensor data regarding the orientation change and position of the Thimble, and receiving from said one or more touch pads information when a user presses any touch pad, and calculating the distance of the movement in space by the finger wearing the Thimble, and communicating via the communication unit information regarding movement, orientation of the Thimble and pressing of a touch pad to said electronic device, wherein said Thimble having a substantially cylindrical form so it can be worn around a finger.

* * * * *